United States Patent
Liu

(10) Patent No.: US 12,041,562 B2
(45) Date of Patent: Jul. 16, 2024

(54) METHOD AND DEVICE FOR TRANSMITTING SYNCHRONIZATION INDICATION INFORMATION

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 537 days.

(21) Appl. No.: 17/289,697

(22) PCT Filed: Nov. 1, 2018

(86) PCT No.: PCT/CN2018/113474
§ 371 (c)(1),
(2) Date: Apr. 28, 2021

(87) PCT Pub. No.: WO2020/087455
PCT Pub. Date: May 7, 2020

(65) Prior Publication Data
US 2022/0007312 A1 Jan. 6, 2022

(51) Int. Cl.
*H04W 56/00* (2009.01)
*H04W 4/06* (2009.01)
(52) U.S. Cl.
CPC ........... *H04W 56/001* (2013.01); *H04W 4/06* (2013.01)
(58) Field of Classification Search
CPC .................................................. H04W 56/001
See application file for complete search history.

(56) References Cited

U.S. PATENT DOCUMENTS

2018/0376511 A1\* 12/2018 Tsai .................. H04W 74/0833

FOREIGN PATENT DOCUMENTS

| CN | 205901761 U | 1/2017 |
| CN | 108012329 A | 5/2018 |

(Continued)

OTHER PUBLICATIONS

NTT Docomo, Inc. "Remaining issues on Synchronization Signal", 3GPP TSG RAN WG1 Meeting #92bis R1-1805031, Apr. 20, 2018(Apr. 20, 2018), sections 2 and 3.

(Continued)

*Primary Examiner* — Hsinchun Liao
(74) *Attorney, Agent, or Firm* — Syncoda LLC; Feng Ma

(57) ABSTRACT

A method for transmitting synchronization indication information includes: determining an actual sending position of a set of synchronous broadcast blocks; generating actual sending position indication information according to the actual sending position, wherein the actual sending position indication information comprises a first indication field, a second indication field, and a third indication field, the first indication field and the second indication field jointly indicate the actual sending position of the set of synchronous broadcast blocks, and the third indication field indicates that a current synchronous broadcast block in the set of synchronous broadcast blocks corresponds to the first indication field or the second indication field; and transmitting the synchronous broadcast block at the actual sending position, and transmitting the actual sending position indication information by means of remaining system information (RMSI).

18 Claims, 8 Drawing Sheets

(56) References Cited

FOREIGN PATENT DOCUMENTS

| | | |
|---|---|---|
| CN | 108064466 A | 5/2018 |
| CN | 108370290 A | 8/2018 |
| CN | 108668366 A | 10/2018 |
| WO | 2014013259 A1 | 1/2014 |
| WO | 2018049274 A1 | 3/2018 |

OTHER PUBLICATIONS

International Search Report in the international application No. PCT/CN2018/113474, mailed on Aug. 8, 2019.
English translation of the Written Opinion of the International Search Authority in the international application No. PCT/CN2018/113474, mailed on Aug. 8, 2019.

* cited by examiner

METHOD AND DEVICE FOR TRANSMITTING SYNCHRONIZATION INDICATION INFORMATION

CROSS-REFERENCE TO RELATED APPLICATION

This application is a U.S. national stage of International Application No. PCT/CN2018/113474 filed on Nov. 1, 2018, the disclosure of which is hereby incorporated by reference in its entirety.

TECHNICAL FIELD

The present disclosure relates to the technical field of communications, and more particularly, to a method and device for transmitting synchronization indication information.

BACKGROUND

In a related art, a project is approved for studying a 5th-generation mobile communication system (5G) unlicensed spectrum recently in the industry, and a scheme for supporting independent networking of 5G unlicensed cells is proposed. In the design of independent networking of 5G unlicensed spectra, the first step is to consider the design of an synchronization signal/physical broadcast channel (SS/PBCH) block (hereinafter referred to as SSB). It is necessary to inform user equipment (UE) how a base station sends an SSB, however there is presently no effective solution in the industry.

SUMMARY

Embodiments of the present disclosure provide a method and device for transmitting synchronization indication information. The technical solutions are as follows.

According to a first aspect of embodiments of the present disclosure, a method for transmitting synchronization indication information is provided, which may include: determining an actual sending position of a group of synchronization signal/physical broadcast channel (SS/PBCH) blocks (SSBs); generating actual sending position indication information according to the actual sending position; the actual sending position indication information may include a first indication field, a second indication field and a third indication field; the first indication field and the second indication field may jointly indicate the actual sending position of the group of SSBs, and the third indication field may indicate whether a present SSB in the group of SSBs corresponds to the first indication field or the second indication field; and transmitting the SSBs at the actual sending position, and transmitting the actual sending position indication information through remaining minimum system information (RMSI).

The technical solution provided by the embodiments of the present disclosure may include the following beneficial effects. The present embodiment provides a new indication mode of actual sending position indication information, which changes the functions of the first indication field and the second indication field, such that the first indication field and the second indication field jointly indicate the actual sending position of the group of SSBs. Moreover, the third indication field is added. The third indication field indicates whether the present SSB in the group of SSBs corresponds to the first indication field or the second indication field. The indication mode is applied to both normal transmission of SSBs and offset transmission.

In an embodiment, the third indication field may occupy 1 bit.

The technical solution provided by the embodiments of the present disclosure may include the following beneficial effects. In the present embodiment, the third indication field occupies 1 bit, and less network resources are occupied.

In an embodiment, default indication information of the present SSB may be in the first indication field and the second indication field.

The technical solution provided by the embodiments of the present disclosure may include the following beneficial effects. In the present embodiment, the first indication field and the second indication field may default indication information of the present SSB. The occupied network resources can be reduced.

In an embodiment, the first indication field and the second indication field may occupy at most 16 bits.

The technical solution provided by the embodiments of the present disclosure may include the following beneficial effects. In the present embodiment, the first indication field and the second indication field occupy at most 16 bits. The compatibility with each version of mobile communication system is better.

In an embodiment, the actual sending position may include an offset position relative to a preferred transmission position configured by a system, and a position of the second indication field may be effective.

The technical solution provided by the embodiments of the present disclosure may include the following beneficial effects. The present embodiment is applied to offset sending of SSBs, which may still be indicated through the actual sending position indication information.

In an embodiment, the actual sending position indication information may further include a fourth indication field, which indicates a number of repetitions of an SSB in the group of SSBs.

The technical solution provided by the embodiments of the present disclosure may include the following beneficial effects. The present embodiment supports repeated intra-group sending of SSBs, which may still be indicated through the actual sending position indication information.

According to a second aspect of embodiments of the present disclosure, a method for transmitting synchronization indication information is provided, which may be applied to a UE side and may include: receiving synchronization signal/physical broadcast channel (SS/PBCH) blocks (SSBs) and actual sending position indication information transmitted through RMSI; the actual sending position indication information may include a first indication field, a second indication field and a third indication field; the first indication field and the second indication field may jointly indicate an actual sending position of a group of SSBs, and the third indication field may indicate whether a presently-received SSB in the group of SSBs corresponds to the first indication field or the second indication field; and performing synchronization processing according to the SSBs and the actual sending position indication information.

In an embodiment, the third indication field may occupy 1 bit.

In an embodiment, default indication information of the present SSB may be in the first indication field and the second indication field. The operation of performing synchronization processing according to the SSBs and the actual sending position indication information may include: a default position of the SSB in the first indication field and the second indication field is determined according to a serial number of the SSB, and the default position is supplemented; and the synchronization processing is performed according to the SSBs and the supplemented actual sending position indication information.

In an embodiment, the first indication field and the second indication field may occupy at most 16 bits.

In an embodiment, the actual sending position may include an offset position relative to a preferred transmission position configured by a system, and a position of the second indication field may be effective.

In an embodiment, the actual sending position indication information may further include a fourth indication field, which indicates a number of repetitions of an SSB in the group of SSBs. The operation of performing the synchronization processing according to the SSBs and the actual sending position indication information may include: repeated SSBs with identical serial numbers are combined according to the actual sending position indication information; and the synchronization processing is performed according to the SSBs after combination and the actual sending position indication information.

According to a third aspect of embodiments of the present disclosure, a device for transmitting synchronization indication information is provided, which may be applied to a base station side and may include: a determination module, configured to determine an actual sending position of a group of synchronization signal/physical broadcast channel (SS/PBCH) blocks (SSBs); a generation module, configured to generate actual sending position indication information according to the actual sending position; the actual sending position indication information may include a first indication field, a second indication field and a third indication field; the first indication field and the second indication field may jointly indicate the actual sending position of the group of SSBs, and the third indication field may indicate whether a present SSB in the group of SSBs corresponds to the first indication field or the second indication field; and a transmission module, configured to transmit the SSBs at the actual sending position, and transmit the actual sending position indication information through RMSI.

In an embodiment, the third indication field may occupy 1 bit.

In an embodiment, default indication information of the present SSB may be in the first indication field and the second indication field.

In an embodiment, the first indication field and the second indication field may occupy at most 16 bits.

In an embodiment, the actual sending position may include an offset position relative to a preferred transmission position configured by a system, and a position of the second indication field may be effective.

In an embodiment, the actual sending position indication information may further include a fourth indication field, which indicates a number of repetitions of an SSB in the group of SSBs.

According to a fourth aspect of embodiments of the present disclosure, a device for transmitting synchronization indication information is provided, which may be applied to a UE side and may include: a receiving module, configured to receive synchronization signal/physical broadcast channel (SS/PBCH) blocks (SSBs) and actual sending position indication information transmitted through remaining minimum system information (RMSI); the actual sending position indication information may include a first indication field, a second indication field and a third indication field; the first indication field and the second indication field may jointly indicate an actual sending position of a group of SSBs, and the third indication field may indicate whether a presently-received SSB in the group of SSBs corresponds to the first indication field or the second indication field; and a processing module, configured to perform synchronization processing according to the SSBs and the actual sending position indication information.

In an embodiment, the third indication field may occupy 1 bit.

In an embodiment, default indication information of the present SSB may be in the first indication field and the second indication field. The processing module may include: a supplementation sub-module, configured to determine a default position of the SSB in the first indication field and the second indication field according to a serial number of the SSB, and supplement the default position; and a first processing sub-module, configured to perform the synchronization processing according to the SSBs and the supplemented actual sending position indication information.

In an embodiment, the first indication field and the second indication field may occupy at most 16 bits.

In an embodiment, the actual sending position may include an offset position relative to a preferred transmission position configured by a system, and a position of the second indication field may be effective.

In an embodiment, the actual sending position indication information may further include a fourth indication field, which indicates a number of repetitions of an SSB in the group of SSBs. The processing module may include: a combination sub-module, configured to combine repeated SSBs with identical serial numbers according to the actual sending position indication information; and a second processing sub-module, configured to perform the synchronization processing according to the SSBs after combination and the actual sending position indication information.

According to a fifth aspect of embodiments of the present disclosure, a device for transmitting synchronization indication information is provided, which may include: a processor; and a memory configured to store instructions executable by the processor.

The processor may be configured to: determine an actual sending position of a group of synchronization signal/physical broadcast channel (SS/PBCH) blocks (SSBs); generate actual sending position indication information according to the actual sending position; the actual sending position indication information may include a first indication field, a second indication field and a third indication field; the first indication field and the second indication field may jointly indicate the actual sending position of the group of SSBs, and the third indication field may indicate whether a present SSB in the group of SSBs corresponds to the first indication field or the second indication field; and transmit the SSBs at the actual sending position, and transmit the actual sending position indication information through remaining minimum system information (RMSI).

According to a sixth aspect of embodiments of the present disclosure, a device for transmitting synchronization indication information is provided, which may include: a processor; and a memory configured to store instructions executable by the processor.

The processor is configured to: receive synchronization signal/physical broadcast channel (SS/PBCH) blocks (SSBs) and actual sending position indication information transmitted through remaining minimum system information (RMSI); the actual sending position indication information may include a first indication field, a second indication field and a third indication field; the first indication field and the second indication field may jointly indicate an actual sending position of a group of SSBs, and the third indication field may indicate whether a presently-received SSB in the group of SSBs corresponds to the first indication field or the second indication field; and perform synchronization processing according to the SSBs and the actual sending position indication information.

According to a seventh aspect of embodiments of the present disclosure, a computer-readable storage medium having stored therein computer instructions that, when executed by a processor, implements the method at the base station side is provided.

According to an eighth aspect of embodiments of the present disclosure, a computer-readable storage medium having stored therein computer instructions that, when executed by a processor, implements the method at the UE side is provided.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the specification, serve to explain the principles of the present disclosure.

DETAILED DESCRIPTION

Figure 1:
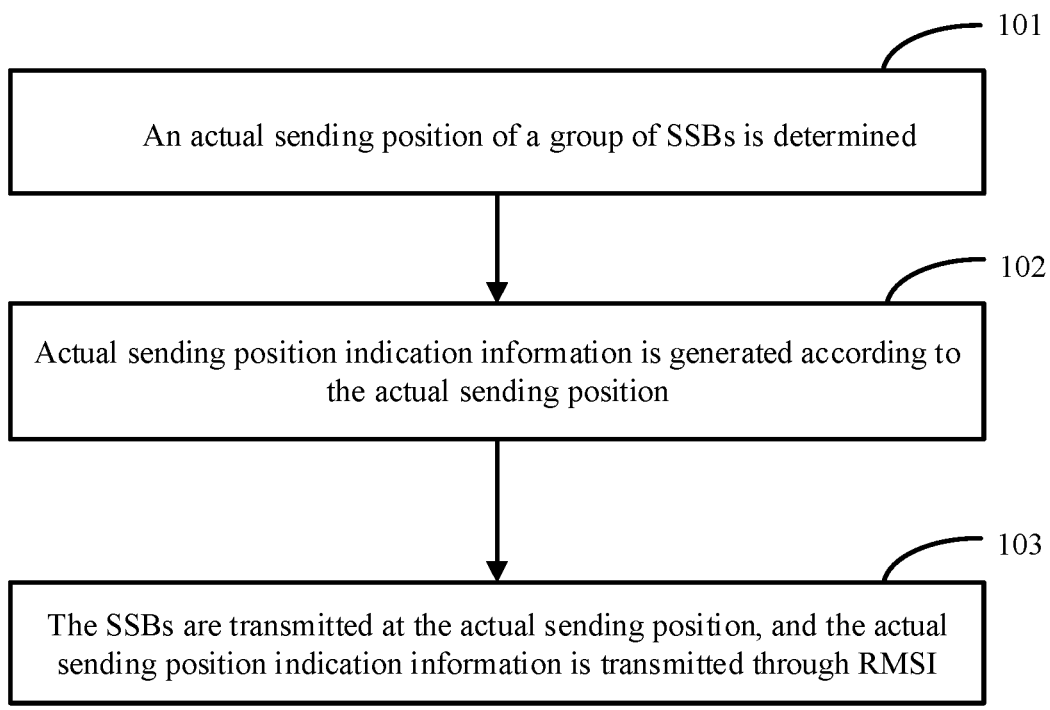
FIG. 1 is a flow chart showing a method for transmitting synchronization indication information, according to an exemplary embodiment.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with aspects related to the present disclosure as recited in the appended claims.

In a related art, a project is approved for studying a 5G unlicensed spectrum recently in the industry, and a scheme for supporting independent networking of 5G unlicensed cells is proposed. In the design of independent networking of 5G unlicensed spectra, the first step is to consider the design of an SSB. For an unlicensed spectrum, a listen before talk (LBT) principle needs to be followed. When an SSB needs to be transmitted, based on the LBT principle, the SSB may not be transmitted at a fixedly configured position of a system since time frequency resources are occupied. At this moment, it is possible to try transmitting the SSB again at an alternative offset transmission position allowed by the system to cause UE to synchronize with a network side in time. Whether the SSB is sent at the fixedly configured position of the system or at the alternative offset transmission position, it is necessary to inform the UE of an actual sending position while sending the SSB. The UE may then parse the SSB and other information on a downlink channel.

In the related art, in a 5G system, actual sending position indication information is transmitted by using 16 bits, and the first 8 bits indicate the transmission condition of each SSB. If a maximum number L of SSBs in a transmission unit specified by the system is equal to 4, the first 4 bits in the first 8 bits are occupied. If the maximum number L is equal to 8 (L=8), the first 8 bits are occupied. If L=64, the first 8 bits indicate the transmission condition of a group of 8 SSBs, and the last 8 bits indicate the transmission condition of 8 groups, which requires that the intra-group transmission conditions of the 8 groups must be consistent. If the transmission is required, they must be consistent. The inventors of the present disclosure have found that when SSBs are transmitted at an alternative offset transmission position, the first 8 bits cannot indicate the transmission condition of each SSB. It can be seen therefrom that the actual sending position indication information in the related art cannot be compatible with the requirements of the unlicensed spectrum.

In order to solve the above problems, a present embodiment provides new actual sending position indication information, which includes a first indication field, a second indication field and a third indication field. The first indication field and the second indication field jointly indicate an actual sending position of the group of SSBs, and the newly added third indication field indicates whether a present SSB in the group of SSBs corresponds to the first indication field or the second indication field.

FIG. 1 is a flow chart showing a method for transmitting synchronization indication information, according to an exemplary embodiment. The method for transmitting synchronization indication information is applied to access network equipment such as a base station and the like. As illustrated in FIG. 1, the method includes the following steps 101 to 103.

In the step 101, an actual sending position of a group of SSBs is determined.

In the step 102, actual sending position indication information is generated according to the actual sending position; the actual sending position indication information includes a first indication field, a second indication field and a third indication field; the first indication field and the second indication field jointly indicate the actual sending position of the group of SSBs, and the third indication field indicates whether a present SSB in the group of SSBs corresponds to the first indication field or the second indication field.

In the step 103, the SSBs are transmitted at the actual sending position, and the actual sending position indication information is transmitted through RMSI.

In the present embodiment, when each SSB is sent, actual sending position indication information corresponding to the SSB is synchronously sent. When the group of SSBs includes at least two SSBs, the actual sending positions of the at least two SSBs are consecutive. In the actual sending position indication information corresponding to each of the group of SSBs, information of the first indication field is identical with information of the second indication field since the first indication field and the second indication field jointly indicate the actual sending position of the group of SSBs instead of an actual sending position of a certain SSB. However, in the actual sending position indication information corresponding to each of the group of SSBs, information of the third indication field may be different.

Figure 2:
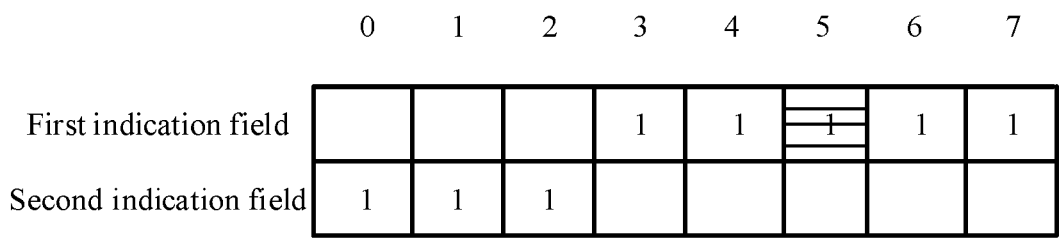
FIG. 2 is a schematic diagram illustrating indication information, according to an exemplary embodiment.

As illustrated in FIG. 2, the first row refers to the first indication field, the second row refers to the second indication field, and a block represents 1-bit indication information and also represents a time frequency resource corresponding to an SSB (hereinafter referred to as a slot block). The shade represents an SSB that is being sent presently, and number 1 represents that there is an SSB transmitted on the time frequency resource. In the present embodiment, the shade is in the first row, i.e. corresponding to the first indication field, and the value of the third indication field is 0, i.e. pointing to the first indication field. Of course, the system may also specify that when the value of the third indication field is 1 it points to the first indication field. The UE receives the third indication field, determines that the presently received SSB corresponds to the first indication field, and may parse other information of/on a present downlink channel according to the first indication field. The UE may also determine that there is a subsequent second indication field based on the third indication field, and may parse other information of a subsequently received downlink channel (i.e., other information except the SSB of the downlink channel) according to the second indication field.

Figure 3:
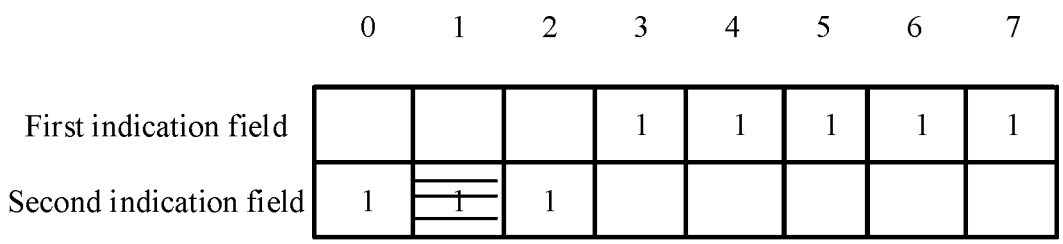
FIG. 3 is a schematic diagram illustrating indication information, according to an exemplary embodiment.

As illustrated in FIG. 3, in the present embodiment, the shade is in the second row, i.e. corresponding to the second indication field, and the value of the third indication field is 1, i.e. pointing to the second indication field. Of course, the system may also specify that when the value of the third indication field is 0 it points to the second indication field. The UE receives the third indication field, determines that the presently received SSB corresponds to the second indication field, and may parse other information of a present downlink channel according to the second indication field. The UE may also determine that there is a previous first indication field based on the third indication field, and may parse other information of the previously received downlink channel according to the first indication field.

In the present embodiment, a group of SSBs needs to be transmitted completely in two groups of slot blocks. When the base station detects whether the time frequency resource is occupied, it is necessary to ensure that a group of SSBs may be transmitted completely in two groups of slot blocks. Otherwise the transmission of SSBs in the two groups of slot blocks is abandoned.

In an embodiment, the third indication field occupies 1 bit.

In the present embodiment, the third indication field occupies only 1 bit, less network resources are occupied, and the network influence is less.

In an embodiment, default indication information of the present SSB is in the first indication field and the second indication field.

The shaded blocks illustrated in FIG. 2 and FIG. 3 of the present embodiment may be default blocks, i.e., the default indication information of the present SSB. If the shaded block is located in the first row, the default indication information of the present SSB is in the first indication field. If the shaded block is located in the second row, the default indication information of the present SSB is in the second indication field.

After receiving the actual sending position indication information, the UE may fill the indication information in the first indication field and the second indication field according to the serial number of the SSB and the third indication field. If L=8, the serial numbers of the SSBs include SSB0, ..., SSB7. Taking FIG. 2 as an example, it is assumed that the present SSB is SSB5, and there are 7 consecutive numbers 1 in the first indication field and the second indication field. A number 1 is filled between the second number 1 and the third number 1, and 8 numbers 1 are supplemented.

The indication information corresponding to the present SSB may be located in the first indication field or the second indication field. Therefore, default indication information of the present SSB is in both the first indication field and the second indication field.

In an embodiment, the first indication field and the second indication field occupy at most 16 bits.

In the present embodiment, the first indication field and the second indication field occupy at most 16 bits. It may be compatible with a 5G new radio (NR) system. Moreover, when the default indication information of the present SSB is in the first indication field and the second indication field, it is also possible to save 1 bit, i.e. occupying 15 bits.

In an embodiment, the actual sending position includes an offset position relative to a preferred transmission position configured by a system, and a position of the second indication field is effective.

The present embodiment supports the specification of the 5G NR system, and SSBs may be transmitted at fixed positions configured by the system. Then, taking L=8 as an example, the first indication field is a full bitmap, i.e. 8 blocks in the first indication field are all 1 and are not empty.

The present embodiment may also support the specification of a 5G unlicensed spectrum, and when the LBT principle is obeyed, taking FIG. 2 as an example, slot blocks corresponding to 0 to 2 in the first row may be occupied, such that SSB0 to SSB2 cannot be normally sent. Therefore, SSB0 to SSB2 are sent in slot blocks corresponding to 0 to 2 in the second row. The slot blocks corresponding to 0 to 2 in the second row are offset positions, i.e. the position of the second indication field is effective. The present embodiment is applied to the case in which L=4 or L=8.

The actual sending position indication information in the present embodiment enables indication of the actual sending position for both cases.

In an embodiment, the actual sending position indication information further includes a fourth indication field which indicates a number of repetitions of an SSB in the group of SSBs.

In the present embodiment, the SSBs may be sent not only at a fixed position specified by the system, but also at an alternative offset position, and repeated sending of the SSBs is supported. When the SSB is repeatedly sent, a fourth indication field indicating a number of repetitions of an SSB in a group of SSBs is added in the actual sending position indication information.

For example, the first indication field and the second indication field are 16 bits in total, corresponding to 16 slot blocks. If L=8, the number of repetitions may be 2. The fourth indication field has a value of 1, which represents a case in which there is repeated sending, and the number of repetitions is 1. The value of 0 represents a case in which there is no repeated sending.

In an embodiment, the fourth indication field occupies at most 2 bits.

As described above, for example, the first indication field and the second indication field are 16 bits in total, corresponding to 16 slot blocks. If L=4, the number of repetitions may be 4. Therefore, the fourth indication field occupies at most 2 bits to represent a case of at most 4 times.

The implementation process of the base station side is described above, and accordingly, the UE side is improved. The implementation process of the UE side will be described below.

Figure 4:
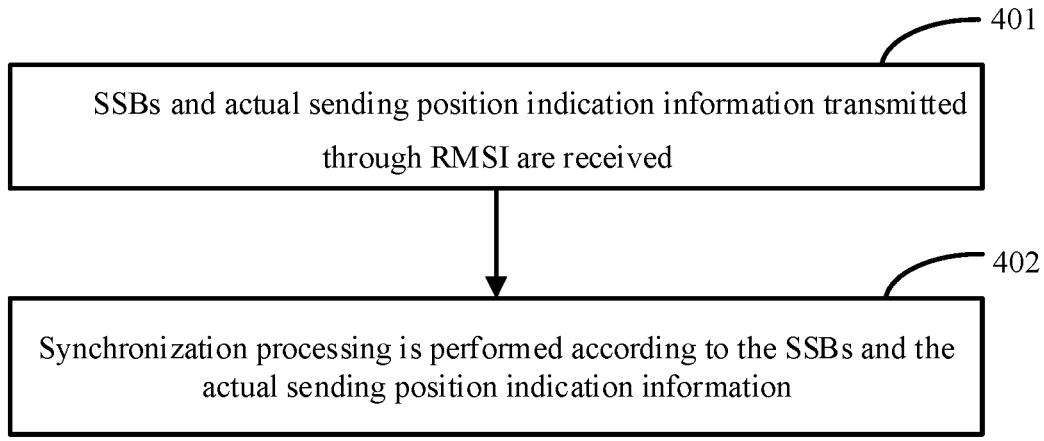
FIG. 4 is a flow chart showing a method for transmitting synchronization indication information, according to an exemplary embodiment.

FIG. 4 is a flow chart showing a method for transmitting synchronization indication information, according to an exemplary embodiment. The method for transmitting synchronization indication information is applied to UE. The UE may be a mobile phone, a computer, a digital broadcast terminal, a messaging device, a gaming console, a tablet, a medical device, exercise equipment, a personal digital assistant, and the like. As illustrated in FIG. 4, the method includes the following steps 401 to 402.

In the step 401, SSBs and actual sending position indication information transmitted through RMSI are received; the actual sending position indication information includes a first indication field, a second indication field and a third indication field; the first indication field and the second indication field jointly indicate an actual sending position of a group of SSBs, and the third indication field indicates whether a presently-received SSB in the group of SSBs corresponds to the first indication field or the second indication field.

In the step 402, synchronization processing is performed according to the SSBs and the actual sending position indication information.

Continuing with the previous example, as illustrated in FIG. 2, the first row refers to the first indication field, the second row refers to the second indication field, and a block represents 1-bit indication information and also represents a time frequency resource corresponding to an SSB (hereinafter referred to as a slot block). The shade represents an SSB that is being sent presently, and number 1 represents that there is an SSB transmitted on the time frequency resource. In the present embodiment, the shade is in the first row, i.e. corresponding to the first indication field, and the value of the third indication field is 0, i.e. pointing to the first indication field. Of course, the system may also specify that when the value of the third indication field is 1 it points to the first indication field. The UE receives the third indication field, determines that the presently received SSB corresponds to the first indication field, and may parse other information of/on a present downlink channel according to the first indication field. The UE may also determine that there is a subsequent second indication field based on the third indication field, and may parse other information of a subsequently received downlink channel (i.e., other information except the SSB of the downlink channel) according to the second indication field.

As illustrated in FIG. 3, in the present embodiment, the shade is in the second row, i.e. corresponding to the second indication field, and the value of the third indication field is 1, i.e. pointing to the second indication field. Of course, the system may also specify that when the value of the third indication field is 0 it points to the second indication field. The UE receives the third indication field, determines that the presently received SSB corresponds to the second indication field, and may parse other information of a present downlink channel according to the second indication field. The UE may also determine that there is a previous first indication field based on the third indication field, and may parse other information of the previously received downlink channel according to the first indication field.

In an embodiment, the third indication field occupies 1 bit.

In the present embodiment, the third indication field occupies only 1 bit, less network resources are occupied, and the network influence is less.

In an embodiment, default indication information of the present SSB is in the first indication field and the second indication field.

Step 402 includes step A1 and step A2.

In the step A1, a default position of the SSB in the first indication field and the second indication field is determined according to a serial number of the SSB, and the default position is supplemented.

In the step A2, the synchronization processing is performed according to the SSBs and the supplemented actual sending position indication information.

The shaded blocks illustrated in FIG. 2 and FIG. 3 of the present embodiment may be default blocks, i.e., the default indication information of the present SSB. If the shaded block is located in the first row, the default indication information of the present SSB is in the first indication field. If the shaded block is located in the second row, the default indication information of the present SSB is in the second indication field.

After receiving the actual sending position indication information, the UE may fill the indication information in the first indication field and the second indication field according to the serial number of the SSB and the third indication field. If L=8, the serial numbers of the SSBs include SSB0, SSB7. Taking FIG. 2 as an example, it is assumed that the present SSB is SSB5, and there are 7 consecutive numbers 1 in the first indication field and the second indication field. A number 1 is filled between the second number 1 and the third number 1, and 8 numbers 1 are supplemented.

In an embodiment, the first indication field and the second indication field occupy at most 16 bits.

In the present embodiment, the first indication field and the second indication field occupy at most 16 bits. It may be compatible with a 5G NR system. Moreover, when the default indication information of the present SSB is in the first indication field and the second indication field, it is also possible to save 1 bit, i.e. occupying 15 bits.

In an embodiment, the actual sending position includes an offset position relative to a preferred transmission position configured by a system, and a position of the second indication field is effective.

The present embodiment supports the specification of the 5G NR system, and SSBs may be transmitted at fixed positions configured by the system. Then, taking L=8 as an example, the first indication field or the second indication field is a full bitmap, i.e. 8 blocks in the first indication field are all 1 and are not empty; or 8 blocks in the second indication field are all 1 and are not empty.

The present embodiment may also support the specification of a 5G unlicensed spectrum, and when the LBT principle is obeyed, taking FIG. 2 as an example, slot blocks corresponding to 0 to 2 in the first row may be occupied, such that SSB0 to SSB2 cannot be normally sent. Therefore, SSB0 to SSB2 are sent in slot blocks corresponding to 0 to 2 in the second row. The slot blocks corresponding to 0 to 2 in the second row are offset positions.

The actual sending position indication information in the present embodiment enables indication of the actual sending position for both cases.

In an embodiment, the actual sending position indication information further includes a fourth indication field which indicates a number of repetitions of an SSB in the group of SSBs.

Step 402 includes step B1 and step B2.

In the step B1, repeated SSBs with identical serial numbers are combined according to the actual sending position indication information.

In the step B2, the synchronization processing is performed according to the SSBs after combination and the actual sending position indication information.

Multiple SSBs are combined, such that the signal intensity of the SSBs can be enhanced, and successful parsing of the SSBs is facilitated. That is, the synchronization processing is facilitated.

For example, the first indication field and the second indication field are 16 bits in total, corresponding to 16 slot blocks. If L=8, the number of repetitions may be 2. The fourth indication field has a value of 1, which represents a case in which there is repeated sending, and the number of repetitions is 1. The UE may combine two SSBs. The value of 0 represents a case in which there is no repeated sending.

In an embodiment, the fourth indication field occupies at most 2 bits.

As described above, for example, the first indication field and the second indication field are 16 bits in total, corresponding to 16 slot blocks. If L=4, the number of repetitions may be 4. Therefore, the fourth indication field occupies at most 2 bits to represent a case of at most 4 times.

The value of the fourth indication field is based on an actual number of repetitions, not necessarily a maximum number of repetitions.

The implementation process of the UE side will be described in detail below by means of several embodiments.

Figure 5:
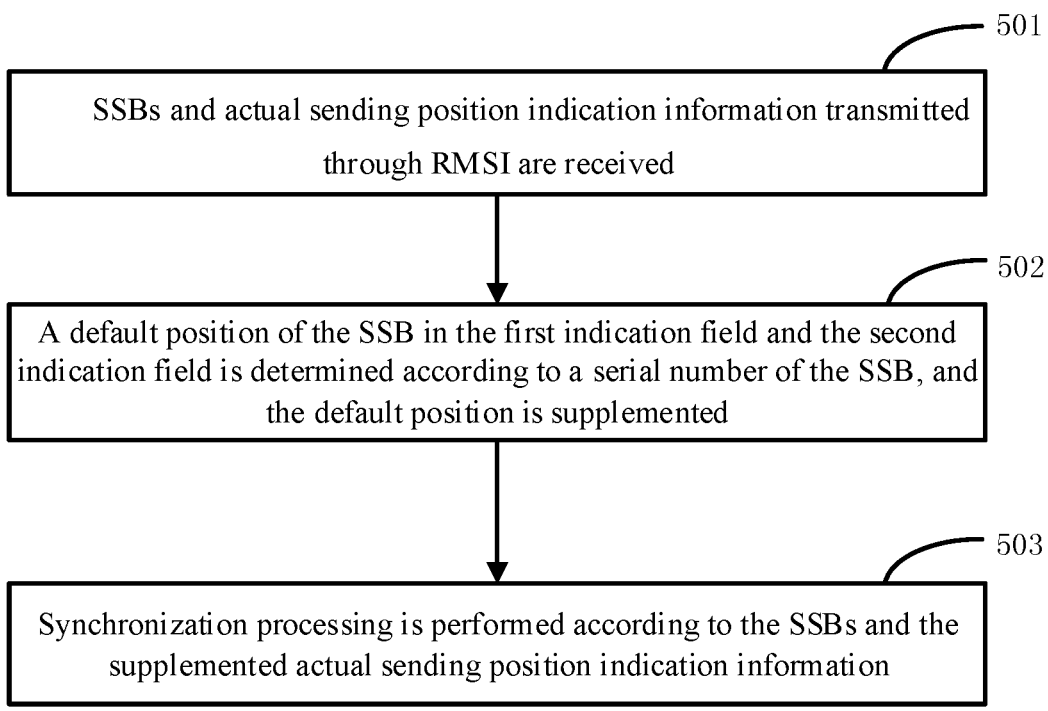
FIG. 5 is a flow chart showing a method for transmitting synchronization indication information, according to an exemplary embodiment.

FIG. 5 is a flow chart showing a method for transmitting synchronization indication information, according to an exemplary embodiment. The method for transmitting synchronization indication information is applied to UE. The UE may be a mobile phone, a computer, a digital broadcast terminal, a messaging device, a gaming console, a tablet, a medical device, exercise equipment, a personal digital assistant, and the like. As illustrated in FIG. 5, the method includes the following steps 501 to 503.

In the step 501, SSBs and actual sending position indication information transmitted through RMSI are received; the actual sending position indication information includes a first indication field, a second indication field and a third indication field; the first indication field and the second indication field jointly indicate an actual sending position of a group of SSBs, and the third indication field indicates whether a presently-received SSB in the group of SSBs corresponds to the first indication field or the second indication field.

In the step 502, a default position of the SSB in the first indication field and the second indication field is determined according to a serial number of the SSB, and the default position is supplemented.

In the step 503, synchronization processing is performed according to the SSBs and the supplemented actual sending position indication information.

Figure 6:
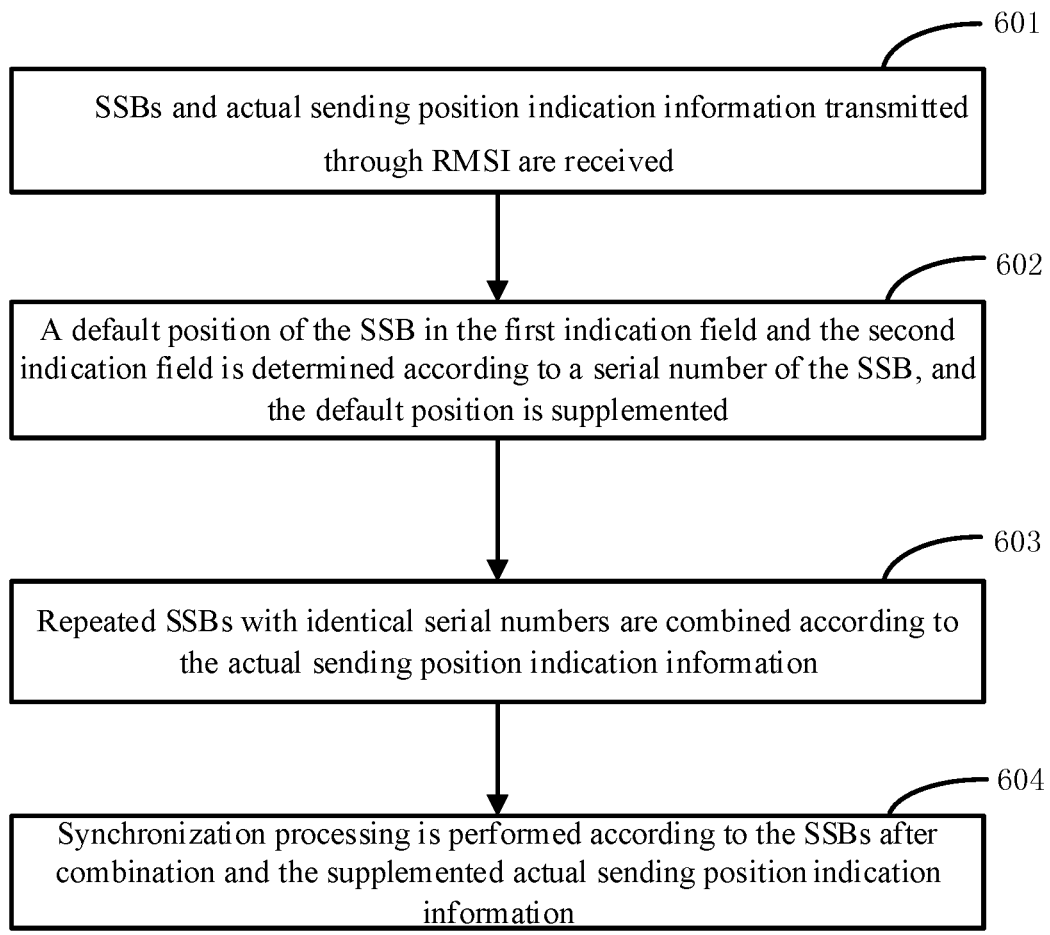
FIG. 6 is a flow chart showing a method for transmitting synchronization indication information, according to an exemplary embodiment.

FIG. 6 is a flow chart showing a method for transmitting synchronization indication information, according to an exemplary embodiment. The method for transmitting synchronization indication information is applied to UE. The UE may be a mobile phone, a computer, a digital broadcast terminal, a messaging device, a gaming console, a tablet, a medical device, exercise equipment, a personal digital assistant, and the like. As illustrated in FIG. 6, the method includes the following steps 601 to 603.

In the step 601, SSBs and actual sending position indication information transmitted through RMSI are received; the actual sending position indication information includes a first indication field, a second indication field and a third indication field; the first indication field and the second indication field jointly indicate an actual sending position of a group of SSBs, and the third indication field indicates whether a presently-received SSB in the group of SSBs corresponds to the first indication field or the second indication field.

In the step 602, a default position of the SSB in the first indication field and the second indication field is determined according to a serial number of the SSB, and the default position is supplemented.

In the step 603, repeated SSBs with identical serial numbers are combined according to the actual sending position indication information.

In the step 604, synchronization processing is performed according to the SSBs after combination and the supplemented actual sending position indication information.

The implementation process will be described below in conjunction with both a base station and UE.

Figure 7:
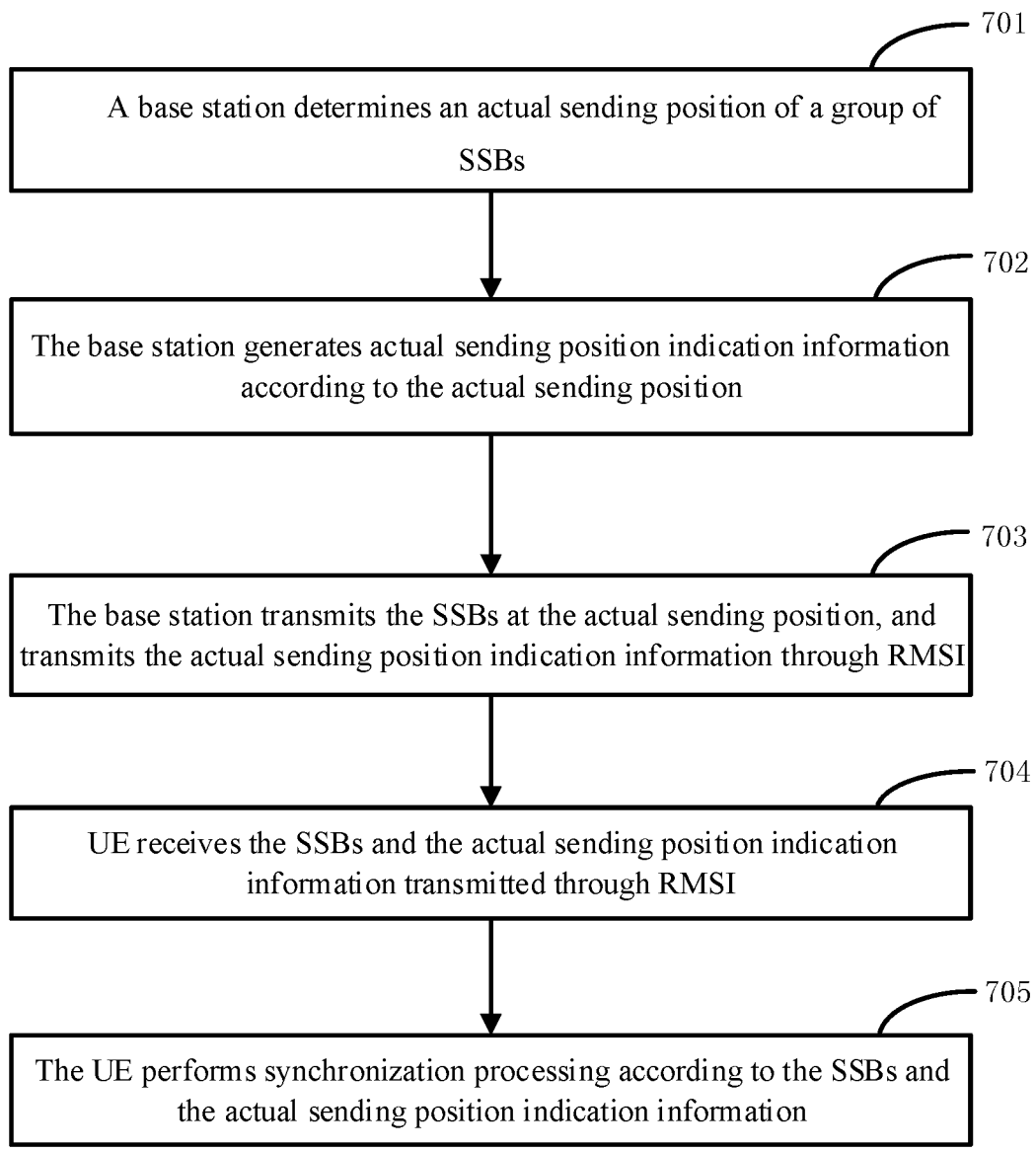
FIG. 7 is a flow chart showing a method for transmitting synchronization indication information, according to an exemplary embodiment.

FIG. 7 is a flow chart showing a method for transmitting synchronization indication information, according to an exemplary embodiment. As illustrated in FIG. 7, the method includes the following steps 701 to 705.

In the step 701, the base station determines an actual sending position of a group of SSBs.

In the step 702, the base station generates actual sending position indication information according to the actual sending position; the actual sending position indication information includes a first indication field, a second indication field and a third indication field; the first indication field and the second indication field jointly indicate the actual sending position of the group of SSBs, and the third indication field indicates whether a present SSB in the group of SSBs corresponds to the first indication field or the second indication field.

In the step 703, the base station transmits the SSBs at the actual sending position, and transmits the actual sending position indication information through RMSI.

In the step 704, the UE receives the SSBs and the actual sending position indication information transmitted through RMSI; the actual sending position indication information includes a first indication field, a second indication field and a third indication field; the first indication field and the second indication field jointly indicate the actual sending position of the group of SSBs, and the third indication field indicates whether a presently-received SSB in the group of SSBs corresponds to the first indication field or the second indication field.

In the step 705, the UE performs synchronization processing according to the SSBs and the actual sending position indication information.

The following are device embodiments of the present disclosure that may be configured to perform the method embodiments of the present disclosure.

Figure 8:
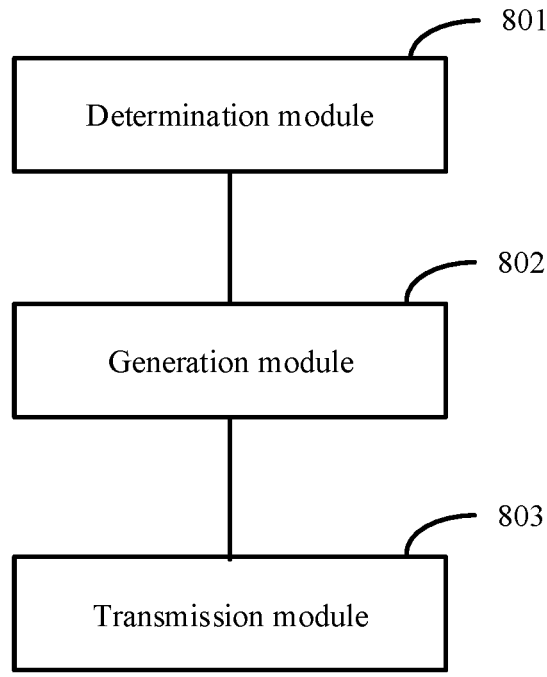
FIG. 8 is a block diagram of a device for transmitting synchronization indication information, according to an exemplary embodiment.

FIG. 8 is a block diagram of a device for transmitting synchronization indication information, according to an exemplary embodiment. The device may be implemented in software, hardware or a combination of both as part or all of an electronic device. Referring to FIG. 8, the device for transmitting synchronization indication information, applied to a base station side, includes a determination module 801, a generation module 802 and a transmission module 803.

The determination module 801 is configured to determine an actual sending position of a group of SSBs.

The generation module 802 is configured to generate actual sending position indication information according to the actual sending position; the actual sending position indication information includes a first indication field, a second indication field and a third indication field; the first indication field and the second indication field jointly indicate the actual sending position of the group of SSBs, and the third indication field indicates whether a present SSB in the group of SSBs corresponds to the first indication field or the second indication field.

The transmission module 803 is configured to transmit the SSBs at the actual sending position, and transmit the actual sending position indication information through RMSI.

In an embodiment, the third indication field occupies 1 bit.

In an embodiment, default indication information of the present SSB is in the first indication field and the second indication field.

In an embodiment, the first indication field and the second indication field occupy at most 16 bits.

In an embodiment, the actual sending position includes an offset position relative to a preferred transmission position configured by a system, and a position of the second indication field is effective.

In an embodiment, the actual sending position indication information further includes a fourth indication field which indicates a number of repetitions of an SSB in the group of SSBs.

In an embodiment, the fourth indication field occupies at most 2 bits.

Figure 9:
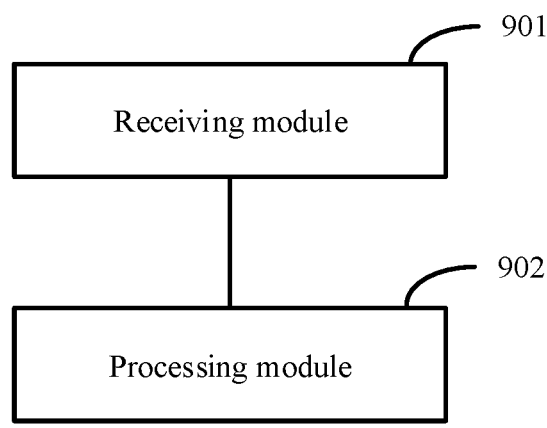
FIG. 9 is a block diagram of a device for transmitting synchronization indication information, according to an exemplary embodiment.

FIG. 9 is a block diagram of a device for transmitting synchronization indication information, according to an exemplary embodiment. The device may be implemented in software, hardware or a combination of both as part or all of an electronic device. Referring to FIG. 9, the device for transmitting synchronization indication information, applied to a UE side, includes a receiving module 901 and a processing module 902.

The receiving module 901 is configured to receive SSBs and actual sending position indication information transmitted through RMSI; the actual sending position indication information includes a first indication field, a second indication field and a third indication field; the first indication field and the second indication field jointly indicate an actual sending position of a group of SSBs, and the third indication field indicates whether a presently-received SSB in the group of SSBs corresponds to the first indication field or the second indication field.

The processing module 902 is configured to perform synchronization processing according to the SSBs and the actual sending position indication information.

In an embodiment, the third indication field occupies 1 bit.

In an embodiment, default indication information of the present SSB may be in the first indication field and the second indication field.

Figure 10:
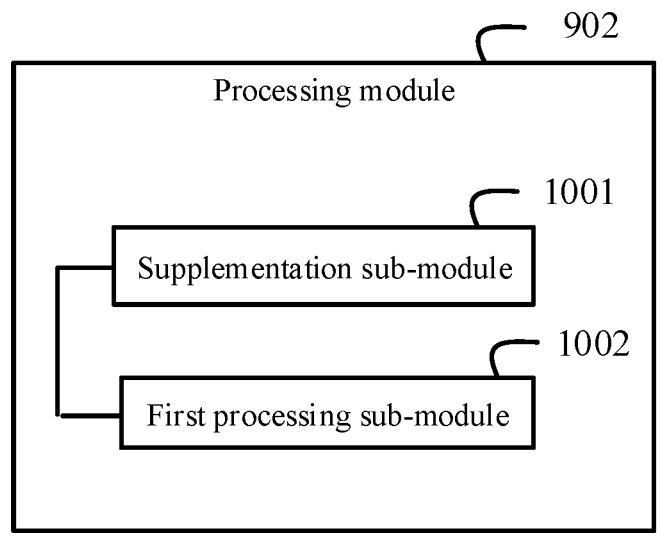
FIG. 10 is a block diagram of a processing module, according to an exemplary embodiment.

As illustrated in FIG. 10, the processing module 902 includes a supplementation sub-module 1001 and a first processing sub-module 1002.

The supplementation sub-module 1001 is configured to determine a default position of the SSB in the first indication field and the second indication field according to a serial number of the SSB, and supplement the default position.

The first processing sub-module 1002 is configured to perform the synchronization processing according to the SSBs and the supplemented actual sending position indication information.

In an embodiment, the first indication field and the second indication field occupy at most 16 bits.

In an embodiment, the actual sending position includes an offset position relative to a preferred transmission position configured by a system, and a position of the second indication field is effective.

In an embodiment, the actual sending position indication information may further include a fourth indication field which indicates a number of repetitions of an SSB in the group of SSBs.

Figure 11:
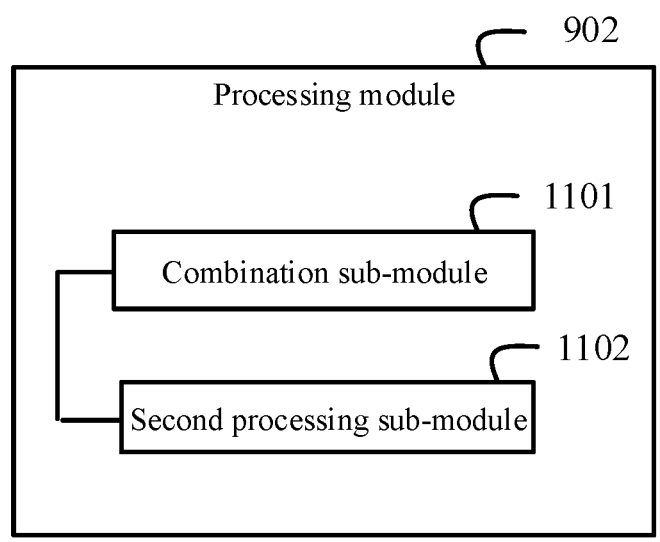
FIG. 11 is a block diagram of a processing module, according to an exemplary embodiment.

As illustrated in FIG. 11, the processing module 902 includes a combination sub-module 1101 and a second processing sub-module 1102.

The combination sub-module 1101 is configured to combine repeated SSBs with identical serial numbers according to the actual sending position indication information.

The second processing sub-module 1102 is configured to perform the synchronization processing according to the SSBs after combination and the actual sending position indication information.

In an embodiment, the fourth indication field occupies at most 2 bits.

With respect to the devices in the above embodiments, the specific manners for performing operations for individual modules therein have been described in detail in the embodiments regarding the methods, which will not be repeated herein.

Figure 12:
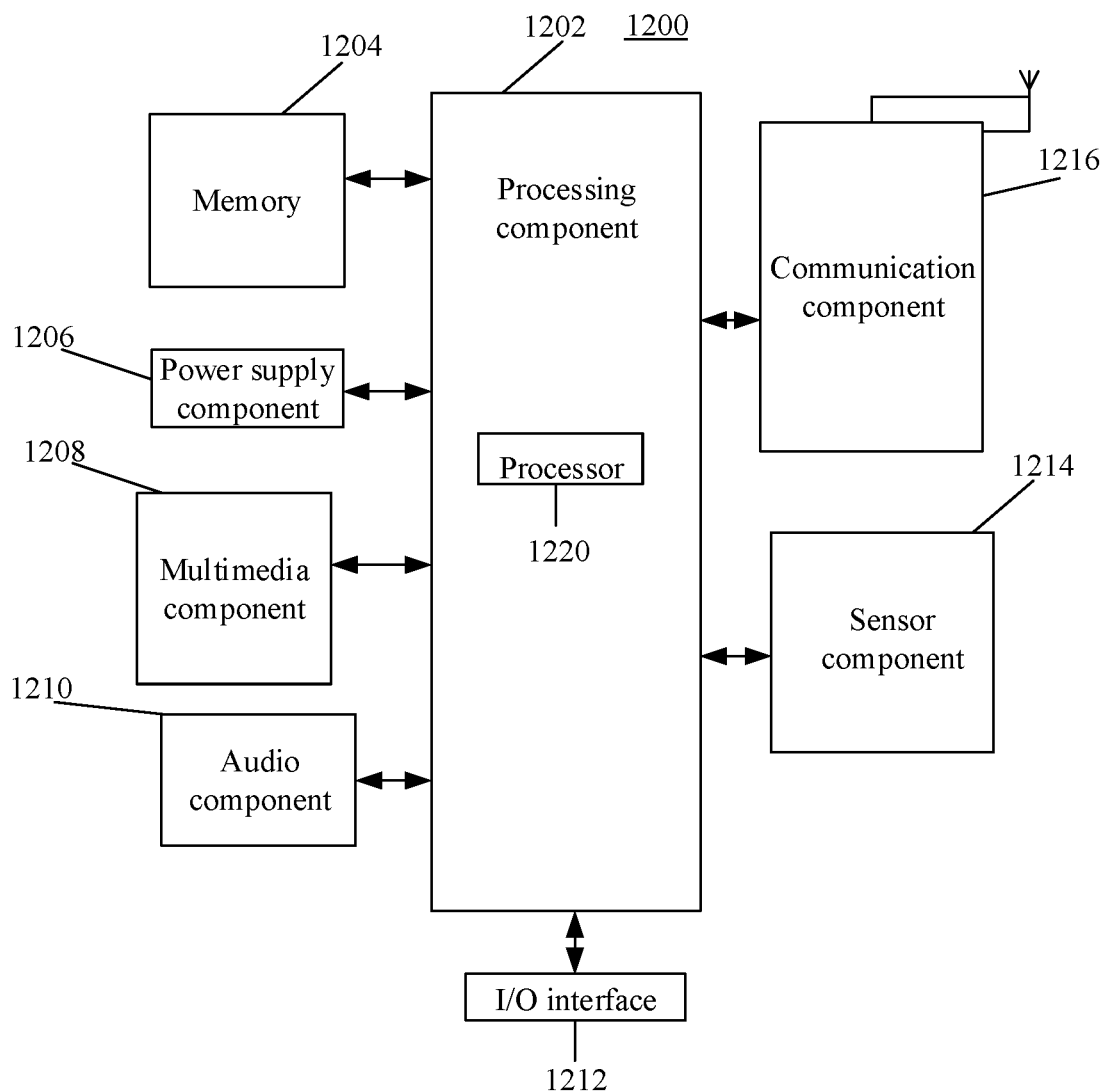
FIG. 12 is a block diagram of a device suitable for transmitting synchronization indication information, according to an exemplary embodiment.

FIG. 12 is a block diagram of a device for transmitting synchronization indication information, according to an exemplary embodiment. For example, the device 1200 may be a mobile phone, a computer, a digital broadcast terminal, a messaging device, a gaming console, a tablet, a medical device, exercise equipment, a personal digital assistant, and the like.

The device 1200 may include one or more of the following components: a processing component 1202, a memory 1204, a power component 1206, a multimedia component 1208, an audio component 1210, an input/output (I/O) interface 1212, a sensor component 1214, or a communication component 1216.

The processing component 1202 typically controls overall operations of the device 1200, such as the operations associated with display, telephone calls, data communications, camera operations, and recording operations. The processing component 1202 may include one or more processors 1220 to execute instructions to perform all or part of the steps in the abovementioned methods. Moreover, the processing component 1202 may include one or more modules which facilitate interaction between the processing component 1202 and other components. For instance, the processing component 1202 may include a multimedia module to facilitate interaction between the multimedia component 1208 and the processing component 1202.

The memory 1204 is configured to store various types of data to support the operation of the device 1200. Examples of such data include instructions for any applications or methods operated on the device 1200, contact data, phonebook data, messages, pictures, video, etc. The memory 1204 may be implemented by any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, and a magnetic or optical disk.

The power component 1206 provides power for various components of the device 1200. The power component 1206 may include a power management system, one or more power supplies, and other components associated with generation, management and distribution of power for the device 1200.

The multimedia component 1208 includes a screen providing an output interface between the device 1200 and a user. In some embodiments, the screen may include a liquid crystal display (LCD) and a touch panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also detect a period of time and a pressure associated with the touch or swipe action. In some embodiments, the multimedia component 1208 includes a front camera and/or a rear camera. The front camera and/or the rear camera may receive external multimedia data when the device 1200 is in an operation mode, such as a photographing mode or a video mode. Each of the front camera and the rear camera may be a fixed optical lens system or have focusing and optical zooming capabilities.

The audio component 1210 is configured to output and/or input an audio signal. For example, the audio component 1210 includes a microphone (MIC), and the MIC is configured to receive an external audio signal when the device 1200 is in an operation mode, such as a call mode, a recording mode and a voice recognition mode. The received audio signal may further be stored in the memory 1204 or sent through the communication component 1216. In some embodiments, the audio component 1210 further includes a speaker configured to output the audio signal.

The I/O interface 1212 provides an interface between the processing component 1202 and peripheral interface modules, such as a keyboard, a click wheel, buttons and the like. The buttons may include, but are not limited to: a home button, a volume button, a starting button and a locking button.

The sensor component 1214 includes one or more sensors configured to provide status assessments in various aspects for the device 1200. For instance, the sensor component 1214 may detect an on/off status of the device 1200 and relative positioning of components, such as a display and small keyboard of the device 1200, and the sensor component 1214 may further detect a change in a position of the device 1200 or a component of the device 1200, presence or absence of contact between the user and the device 1200, orientation or acceleration/deceleration of the device 1200 and a change in temperature of the device 1200. The sensor component 1214 may include a proximity sensor configured to detect presence of an object nearby without any physical contact. The sensor component 1214 may also include a light sensor, such as a complementary metal oxide semiconductor (CMOS) or charge coupled device (CCD) image sensor, configured for use in an imaging application. In some embodiments, the sensor component 1214 may also include an acceleration sensor, a gyroscope sensor, a magnetic sensor, a pressure sensor or a temperature sensor.

The communication component 1216 is configured to facilitate wired or wireless communication between the device 1200 and other devices. The device 1200 may access a communication-standard-based wireless network, such as a wireless fidelity (WiFi) network, a 2nd-generation (2G) or 3rd-generation (3G) network or a combination thereof. In an exemplary embodiment, the communication component 1216 receives a broadcast signal or broadcast associated information from an external broadcast management system through a broadcast channel. In an exemplary embodiment, the communication component 1216 further includes a near field communication (NFC) module to facilitate short-range communications. For example, the NFC module may be implemented based on a radio frequency identification (RFID) technology, an infrared data association (IrDA) technology, an ultra-wide band (UWB) technology, a Bluetooth (BT) technology, and other technologies.

In an exemplary embodiment, the device 1200 may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors or other electronic components, and is configured to execute the abovementioned methods.

In an exemplary embodiment, there is also provided a non-transitory computer-readable storage medium including instructions, such as included in the memory 1204, executable by the processor 1220 of the device 1200 for performing the abovementioned methods. For example, the non-transitory computer-readable storage medium may be a ROM, a random access memory (RAM), a compact disc read-only memory (CD-ROM), a magnetic tape, a floppy disc, an optical data storage device, and the like.

In exemplary embodiments, a device for transmitting synchronization indication information is provided, which includes a processor and a memory configured to store instructions executable by the processor.

The processor is configured to:
receive SSBs and actual sending position indication information transmitted through RMSI; the actual sending position indication information includes a first indication field, a second indication field and a third indication field; the first indication field and the second indication field jointly indicate an actual sending position of a group of SSBs, and the third indication field indicates whether a presently-received SSB in the group of SSBs corresponds to the first indication field or the second indication field; and
perform synchronization processing according to the SSBs and the actual sending position indication information.

The processor may further be configured as follows:
the third indication field occupies 1 bit.
The processor may further be configured as follows:

default indication information of the present SSB is in the first indication field and the second indication field.

The operation of performing the synchronization processing according to the SSBs and the actual sending position indication information includes:

a default position of the SSB in the first indication field and the second indication field is determined according to a serial number of the SSB, and the default position is supplemented; and the synchronization processing is performed according to the SSBs and the supplemented actual sending position indication information.

The processor may further be configured as follows:
the first indication field and the second indication field occupy at most 16 bits.

The processor may further be configured as follows:
the actual sending position includes an offset position relative to a preferred transmission position configured by a system, and a position of the second indication field is effective.

The processor may further be configured as follows:
the actual sending position indication information further includes a fourth indication field, which indicates a number of repetitions of an SSB in the group of SSBs.

The operation of performing the synchronization processing according to the SSBs and the actual sending position indication information includes:

repeated SSBs with identical serial numbers are combined according to the actual sending position indication information; and the synchronization processing is performed according to the SSBs after combination and the actual sending position indication information.

The processor may further be configured as follows:
the fourth indication field occupies at most 2 bits.

A computer-readable storage medium is provided. When instructions in the storage medium are executed by a processor of a device, the device performs the method for transmitting synchronization indication information. The method includes:

receiving SSBs and actual sending position indication information transmitted through RMSI; the actual sending position indication information includes a first indication field, a second indication field and a third indication field; the first indication field and the second indication field jointly indicate an actual sending position of a group of SSBs, and the third indication field indicates whether a presently-received SSB in the group of SSBs corresponds to the first indication field or the second indication field; and performing synchronization processing according to the SSBs and the actual sending position indication information.

The instructions in the storage medium may further include:
the third indication field occupies 1 bit.

The instructions in the storage medium may further include:
default indication information of the present SSB is in the first indication field and the second indication field.

The operation of performing the synchronization processing according to the SSBs and the actual sending position indication information includes:

a default position of the SSB in the first indication field and the second indication field is determined according to a serial number of the SSB, and the default position is supplemented; and the synchronization processing is performed according to the SSBs and the supplemented actual sending position indication information.

The instructions in the storage medium may further include:
the first indication field and the second indication field occupy at most 16 bits.

The instructions in the storage medium may further include:
the actual sending position includes an offset position relative to a preferred transmission position configured by a system, and a position of the second indication field is effective.

The instructions in the storage medium may further include:
the actual sending position indication information further includes a fourth indication field, which indicates a number of repetitions of an SSB in the group of SSBs.

The operation of performing the synchronization processing according to the SSBs and the actual sending position indication information includes:

repeated SSBs with identical serial numbers are combined according to the actual sending position indication information; and the synchronization processing is performed according to the SSBs after combination and the actual sending position indication information.

The instructions in the storage medium may further include:
the fourth indication field occupies at most 2 bits.

Figure 13:
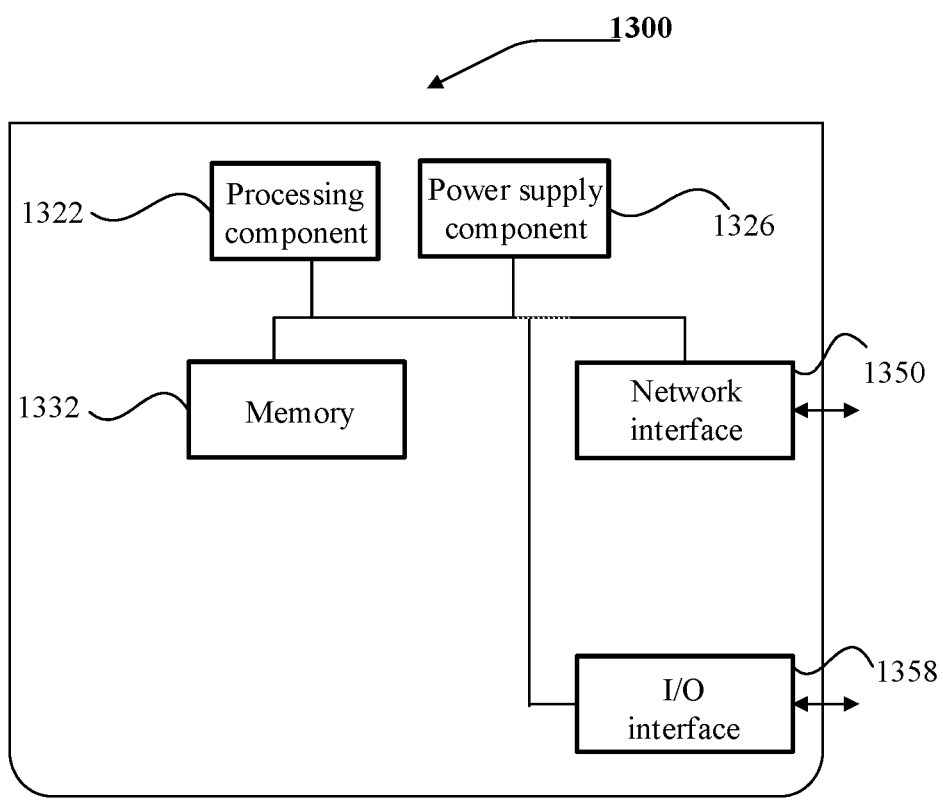
FIG. 13 is a block diagram of a device suitable for transmitting synchronization indication information, according to an exemplary embodiment.

FIG. 13 is a block diagram of a device 1300 for data synchronization, according to an exemplary embodiment. For example, the device 1300 may be provided as a computer. Referring to FIG. 13, the device 1300 includes a processing component 1322 including one or more processors, and memory resources represented by a memory 1332 for storing instructions, such as applications, executable by the processing component 1322. The applications stored in the memory 1332 may include one or more modules each corresponding to a set of instructions. In addition, the processing component 1322 is configured to execute the instructions to perform the above data synchronization method.

The device 1300 may also include a power supply component 1326 configured to execute power management of the device 1300, a wired or wireless network interface 1350 configured to connect the device 1300 to the network, and an I/O interface 1358. The device 1300 may operate an operating system stored in the memory 1332, such as Windows Server™, Mac OS X™, Unix™, Linux™, FreeBSD™ or the like.

In exemplary embodiments, a device for transmitting synchronization indication information is provided, which includes a processor and a memory configured to store instructions executable by the processor.

The processor is configured to:
determine an actual sending position of a group of SSBs;
generate actual sending position indication information according to the actual sending position; the actual sending position indication information includes a first indication field, a second indication field and a third indication field; the first indication field and the second indication field jointly indicate the actual sending position of the group of SSBs, and the third indication field indicates whether a present SSB in the group of SSBs corresponds to the first indication field or the second indication field; and transmit the SSBs at the actual sending position, and transmit the actual sending position indication information through RMSI.

The processor may further be configured as follows: the third indication field occupies 1 bit.

The processor may further be configured as follows: default indication information of the present SSB is in the first indication field and the second indication field.

The processor may further be configured as follows: the first indication field and the second indication field occupy at most 16 bits.

The processor may further be configured as follows: the actual sending position includes an offset position relative to a preferred transmission position configured by a system, and a position of the second indication field is effective.

The processor may further be configured as follows: the actual sending position indication information further includes a fourth indication field, which indicates a number of repetitions of an SSB in the group of SSBs.

The processor may further be configured as follows: the fourth indication field occupies at most 2 bits.

A computer-readable storage medium is provided. When instructions in the storage medium are executed by a processor of a device, the device performs the method for transmitting synchronization indication information. The method includes:

determining an actual sending position of a group of SSBs;

generating actual sending position indication information according to the actual sending position; the actual sending position indication information includes a first indication field, a second indication field and a third indication field; the first indication field and the second indication field jointly indicate the actual sending position of the group of SSBs, and the third indication field indicates whether a present SSB in the group of SSBs corresponds to the first indication field or the second indication field; and transmitting the SSBs at the actual sending position, and transmitting the actual sending position indication information through RMSI.

The instructions in the storage medium may further include:

the third indication field occupies 1 bit.

The instructions in the storage medium may further include:

default indication information of the present SSB is in the first indication field and the second indication field.

The instructions in the storage medium may further include:

the first indication field and the second indication field occupy at most 16 bits.

The instructions in the storage medium may further include:

the actual sending position includes an offset position relative to a preferred transmission position configured by a system, and a position of the second indication field is effective.

The instructions in the storage medium may further include:

the actual sending position indication information further includes a fourth indication field, which indicates a number of repetitions of an SSB in the group of SSBs.

The instructions in the storage medium may further include:

the fourth indication field occupies at most 2 bits.

After considering the specification and implementing the present disclosure disclosed here, other implementation solutions of the present disclosure would readily be conceivable to a person skilled in the art. The present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It is to be understood that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method for transmitting synchronization indication information, applied to a base station side, comprising:

determining an actual sending position of a group of synchronization signal/physical broadcast channel (SS/PBCH) blocks (SSBs);

generating actual sending position indication information according to the actual sending position; wherein the actual sending position indication information comprises a first indication field, a second indication field and a third indication field; the first indication field and the second indication field jointly indicate the actual sending position of the group of SSBs, and the third indication field indicates whether a present SSB in the group of SSBs corresponds to the first indication field or the second indication field; and transmitting the SSBs at the actual sending position, and transmitting the actual sending position indication information through remaining minimum system information (RMSI), wherein at least one of the following applies:

the actual sending position comprises an offset position relative to a preferred transmission position configured by system, and a position of the second indication field is effective; or the actual sending position indication information further comprises a fourth indication field, which s a number of repetitions of an SSB in the group of SSBs.

2. The method of claim 1, wherein the third indication field occupies 1 bit.

3. The method of claim 1, wherein default indication information of the present SSB is in the first indication field and the second indication field.

4. The method of claim 1, wherein the first indication field and the second indication field occupy at most 16 bits.

5. A method for transmitting synchronization indication information, applied to user equipment (UE) side, comprising:

receiving synchronization signal/physical broadcast channel (SS/PBCH) blocks (SSBs) and actual sending position indication information transmitted through remaining minimum system information (RMSI); wherein the actual sending position indication information comprises a first indication field, a second indication field and a third indication field; the first indication field and the second indication field jointly indicate an actual sending position of a group of SSBs, and the third indication field indicates whether a presently-received SSB in the group of SSBs corresponds to the first indication field or the second indication field; and performing synchronization processing according to the SSBs and the actual sending position indication information, wherein at least one of the following applies:

the actual sending position comprises an offset position relative to a preferred transmission position configured by a system, and a position of the second indication field is effective; or the actual sending position indication information further comprises a fourth indication field, which indicates a number of repetitions of an SSB in the group of SSBs.

6. The method of claim 5, wherein the third indication field occupies 1 bit.

7. The method of claim 5, wherein default indication information of the present SSB is in the first indication field and the second indication field;

wherein the performing the synchronization processing according to the SSBs and the actual sending position indication information comprises:

determining a default position of the SSB in the first indication field and the second indication field according to a serial number of the SSB, and supplementing the default position; and performing the synchronization processing according to the SSBs and the supplemented actual sending position indication information.

8. The method of claim 5, wherein the first indication field and the second indication field occupy at most 16 bits.

9. The method of claim 5, wherein the performing the synchronization processing according to the SSBs and the actual sending position indication information comprises:

combining repeated SSBs with identical serial numbers according to the actual sending position indication information; and performing the synchronization processing according to the SSBs after combination and the actual sending position indication information.

10. A device for transmitting synchronization indication information, applied to a base station side, comprising:

a processor; and memory for storing instructions executable by the processor;

wherein the processor is configured to:

determine an actual sending position of a group of synchronization signal/physical broadcast channel (SS/PBCH) blocks (SSBs);

generate actual sending position indication information according to the actual sending position; wherein the actual sending position indication information comprises a first indication field, a second indication field and a third indication field; the first indication field and the second indication field jointly indicate the actual sending position of the group of SSBs, and the third indication field indicates whether a present SSB in the group of SSBs corresponds to the first indication field or the second indication field; and transmit the SSBs at the actual sending position, and transmit the actual sending position indication information through remaining minimum system information (RMSI), wherein at least one of the following applies:

the actual sending position comprises offset position relative to a referred transmission position configured by a system, and a position of the second indication field is effective; or the actual sending position indication information further comprises a fourth indication field, which indicates a number of repetitions of an SSB in the group of SSBs.

11. The device of claim 10, wherein the third indication field occupies 1 bit.

12. The device of claim 10, wherein default indication information of the present SSB is in the first indication field and the second indication field.

13. The device of claim 10, wherein the first indication field and the second indication field occupy at most 16 bits.

14. A device for transmitting synchronization indication information implementing operations of the method for transmitting synchronization indication information of claim 5, applied to user equipment (UE) side, comprising:

a processor; and memory for storing instructions executable by the processor;

wherein the processor is configured to:

receive synchronization signal/physical broadcast channel (SS/PBCH) blocks (SSBs) and actual sending position indication information transmitted through remaining minimum system information (RMSI); wherein the actual sending position indication information comprises a first indication field, a second indication field and a third indication field; the first indication field and the second indication field jointly indicate an actual sending position of a group of SSBs, and the third indication field indicates whether a presently-received SSB in the group of SSBs corresponds to the first indication field or the second indication field; and perform synchronization processing according to the SSBs and the actual sending position indication information, wherein at least one of the following applies:

the actual sending position comprises an offset position relative to a preferred transmission position configured by a system, and a position of the second indication field is effective; or the actual sending position indication information further comprises a fourth indication field, which indicates a number of repetitions of an SSB in the group of SSBs.

15. The device of claim 14, wherein default indication information of the present SSB is in the first indication field and the second indication field;

wherein the processor is further configured to:

determine a default position of the SSB in the first indication field and the second indication field according to a serial number of the SSB, and supplement the default position; and perform the synchronization processing according to the SSBs and the supplemented actual sending position indication information.

16. The device of claim 14, wherein the third indication field occupies one bit.

17. The device of claim 14 wherein the first indication field and the second indication field occupy at most sixteen bits.

18. The device of claim 14, wherein the processor is further configured to:

combine repeated SSBs with identical serial numbers according to the actual sending position indication information; and perform the synchronization processing according to the SSBs after combination and the actual sending position indication information.

\* \* \* \* \*